Jan. 30, 1968        S. PAPETTI        3,366,657

ORGANODISILA-OXANYL CARBORANES

Filed Sept. 20, 1963

FORMULA I

○ BORON

◈ CARBON

○ HYDROGEN ON CARBON
(HYDROGEN ATOMS ON BORON
OMITTED FOR CLARITY)

INVENTOR.
STELVIO PAPETTI
BY Walter D. Hunter

AGENT

United States Patent Office 3,366,657
Patented Jan. 30, 1968

3,366,657
ORGANODISILA-OXANYL CARBORANES
Stelvio Papetti, Hamden, Conn., assignor to Olin Mathieson Chemical Corporation, a corporation of Virginia
Filed Sept. 20, 1963, Ser. No. 310,420
2 Claims. (Cl. 260—448.2)

ABSTRACT OF THE DISCLOSURE

Cyclic silicon-containing organoboron compounds are prepared by a bis(haloalkylsilyl) carborane, such as bis (chlorodimethylsilyl) carborane with a stoichiometric excess of water at a temperature of about 0° C. to about 150° C. Preferably, the reaction is conducted in the presence of a water-miscible solvent such as acetone, a mixture of acetone and benzene, etc.

Figure 1:
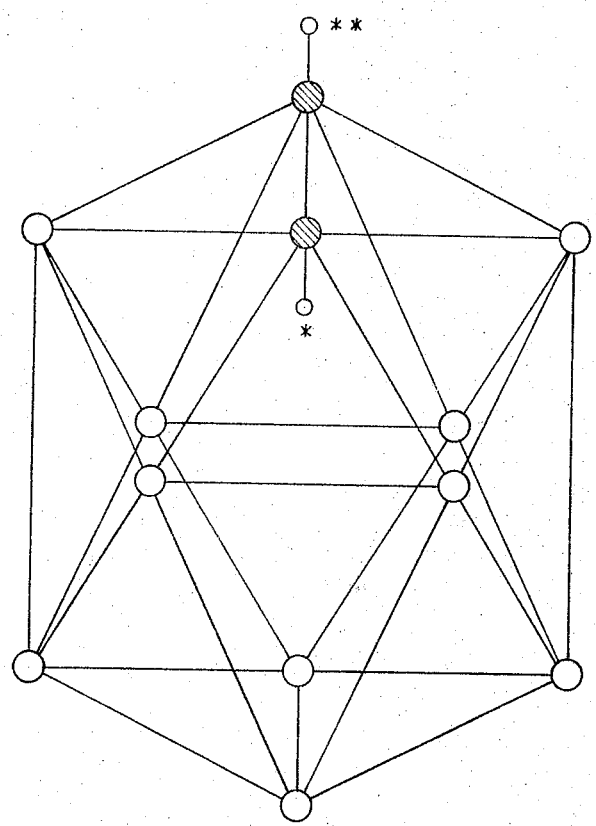

This invention relates to silicon-containing organoboron compounds and to a method for their preparation.

The novel silicon-containing organoboron cmpunds of this invention have the formula:

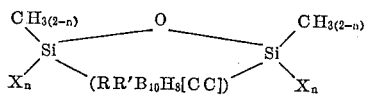

wherein R and R' are selected from the group consisting of hydrogen and an alkyl radical containing from 1 to 5 carbon atoms, is a halogen selected from the group consisting of chlorine, bromine and iodine, and $n$ is an integer of from 0 to 2 inclusive.

The novel compounds of this invention are prepared by reacting with a stoichiometric excess of water a carborane compound of the formula:

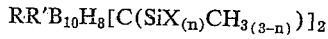

wherein R and R' are each selected from the group consisting of hydrogen and an alkyl radical containing from 1 to 5 carbon atoms, and X is a halogen selected from the group consisting of chlorine, bromine and iodine and $n$ is an integer of from 1 to 3.

The carborane compounds utilized as starting materials in the process of this invention, which have the formula:

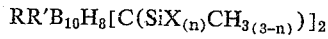

can be prepared by the method set forth in Papetti application Ser. No. 310,379, filed Sept. 20, 1963 for Compound and Process. For example, the compound

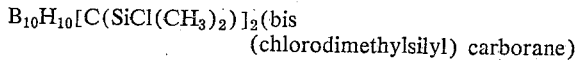

can be prepared by reacting carborane

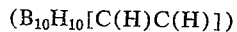

successively with butyl lithium and dichlorodimethylsilane in an ether solution at ice bath temperature.

Compounds of the carborane type can be prepared by the reaction of decarborane or an alkylated decaborane having one to two alkyl groups containing 1 to 5 carbon atoms in each alkyl group with an acetylenic hydrocarbon containing from two to ten carbon atoms in the presence of a wide variety of ethers, nitriles or amines. The preparation of these compounds is described in application Ser. No. 741,976, filed June 13, 1958 of Ager, Heying and Mangold, now abandoned. For example, carborane ($B_{10}H_{10}[C(H)C(H)]$) can be made by reacting for about 12 hours at 125° C. a mixture of decaborane and tetrahydrofuran in an autoclave pressured to 100 p.s.i. with acetylene.

Generally, the reaction is carried out at room temperature although temperatures of from about 0° C. to about 150° C. can be employed, if desired. Preferably the reaction temperature is maintained between about 0° C. and 100° C. A stoichiometric excess of water is required in this novel hydrolysis reaction and, generally, from about 2.5 moles to about 75 moles or more of water will be employed per mole of the organoboron compound charged to the reactor. The reaction will usually be completed in from about 0.05 hour to about 4 hours or more depending upon the particular reaction conditions. It has been found in the reaction that the product can be conveniently separated from the reaction mixture by a variety of methods including extraction, evaporation of the reaction mixture followed by crystallization and filtration, etc. Although the reaction is ordinarily carried out at atmospheric pressure, if desired, pressures varying from sub-atmospheric up to about +5 atmospheres or more can be employed.

The solid products prepared in accordance with the method of this invention, when incorporated with suitable oxidizers such as ammonium perchlorate, potassium perchlorate, sodium perchlorate, ammonium nitrate and the like, yield solid propellants suitable for rocket power plants and other jet propelled devices. Such propellants burn with high flame speeds, have high heats of combustion and are of the high specific impulse type. The solid products of this invention when incorporated with oxidizers are capable of being formed into a wide variety of grains, tablets and shapes, all with desirable mechanical and chemical properties. Propellants produced by the methods described in this application burn uniformly without disintegration when ignited by conventional means, such as a pyrotechnic type igniter, and are mechanically strong enough to withstand ordinary handling.

Preferably the reaction is carried out in the presence of a water-miscible solvent. Suitable solvents include, for example, acetone, ethyl acetate, acetonitrile, and dioxane and mixtures of these materials. Bis(haloalkylsilyl) carboranes suitable as starting materials in the method of this invention include bis(chloro dimethylsilyl) carborane, bis(dichloro methylsilyl) carborane, bis(trichlorosilyl) carborane, and the corresponding bromine and iodine derivatives.

The following examples illustrate specific embodiments of this invention and are not to be considered limitative.

In the examples the term "moles" signifies gram moles."

EXAMPLE I

C,C'(1,1,3,3-tetramethyldisila oxanyl-1,3)carborane (A)

Bis(chloro dimethylsilyl) carborane (12.5 g., 0.0379 mole) was dissolved in 50 ml. of acetone and 20 ml. of water was added dropwise at room temperature. In the next step 50 ml. of benzene was added to bring into solution the solid which had precipitated on addition of the water. The reaction mixture was then stirred for 65 minutes. The solution was concentrated under reduced pressure until most of the benzene and acetone were removed. Finally the remaining mixture was filtered and the residue sublimed under vacuum (about 0.1 mm.) at 100°–130° C. yielding a practically quantitative yield of the compound C,C'(1,1,3,3-tetramethyldisila oxanyl-1,3) carborane (M.P. 160–161° C.).

*Analysis.*—Calc'd for $C_6H_{22}B_{10}OSi_2$: C, 26.20; H, 8.07; B, 39.33; Si, 20.42. Found: C, 26.55; H, 8.06; B, 39.30; Si, 19.7.

The compound C,C'(1,1,3,3-tetramethyldisila oxanyl-1,3) carborane (Compound A) has the formula:

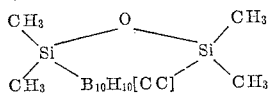

The structural formula of compound A is the same as structural Formula I in FIGURE 1 with the exception that the hydrogen atoms indicated by the single and double asterisks are replaced by the radical:

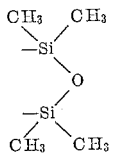

EXAMPLES II–VI

A number of additional experiments were carried out in the same manner as Example I. Pertinent data relating to these experiments is given in Table 1 which follows:

can also contain an artificial resin, generally of the urea-formaldehyde or phenol-formaldehyde type. The function of the resin is to give the propellant mechanical strength and at the same time improve its burning characteristics. Thus, in the manufacture of a suitable propellant, proper proportions of finely divided oxidizer and finely divided boron-containing material can be admixed with a high solids content solution of partially condensed urea-formaldehyde or phenol-formaldehyde resin, the proportions being such that the amount of resin is about 5 to 10 percent by weight based upon the weight of oxidizer and the boron compound. The ingredients can be thoroughly mixed with simultaneous removal solvent, and following this the solvent free mixture can be molded into the desired shape as by extrusion. Thereafter, the resin can be cured by resorting to heating at moderate temperatures. For further information concerning the formulation of solid propellant compositions, reference is made to U.S. Patent 2,622,277 to Bonnell and to U.S. Patent 2,646,596 to Thomas.

TABLE 1.—PREPARATION OF C,C'(1,1,3,3-TETRAMETHYLDISILA OXANYL-1,3) CARBORANE

| Example | Reactor Charge | | | Temp. (°C.) | Reaction Time (min.) | Remarks | Yield |
| --- | --- | --- | --- | --- | --- | --- | --- |
| | Solvent (ml.) | Bis(Chloro dimethylsilyl) Carborane (mole) | Water (ml.) | | | | |
| II | (¹) | .00062 | 5 | 100 | 30 | Product sublimed | (²). |
| III | Acetone (50), Benzene (40) | .0023 | 10 | Room temp. | 75 | do | 96 percent. |
| IV | Acetone (50, Benzene (50) | .0379 | 20 | Room temp. | 75 | do | Practically quantitative. |
| V | Acetone (500) | .294 | 65 | Room temp. | 60 | Product crystallized from heptane. | 99.5 percent. |
| VI | Acetone (25), Benzene (120) | .0606 | 20 | 0 | 60 | | Practically quantitative. |

¹ No solvent was employed in this example.  ² Not determined.

The boron-containing solid materials produced by practicing the method of this invention can be employed as ingredients of solid propellant compositions in accordance with general procedures which are well understood in the art, inasmuch as the solids produced by practicing the present process are readily oxidized using conventional solid oxidizers such as ammonium perchlorate, potassium perchlorate, sodium perchlorate, ammonium nitrate and the like. In formulating a solid propellant composition employing one of the materials produced in accordance with the present invention, generally from 10 to 35 parts by weight of boron-containing material and 65 to 90 parts by weight of the oxidizer are used. In the propellant, the oxidizer and the product of the present process are formulated in admixture with each other by finely subdividing each of the materials and thereafter intimately mixing them. The purpose of doing this, as the art is well aware, is to provide proper burning characteristics in the final propellant. In addition to the oxidizer and the oxidizable material, the final propellant

What is claimed is:

1. Silicon-containing organoboron compounds of the formula:

$$\begin{array}{c} CH_{3(2-n)} \\ \diagdown \\ Si \\ \diagup \\ X_n \end{array} \begin{array}{c} O \\ \\ (RR'B_{10}H_8[CC]) \end{array} \begin{array}{c} CH_{3(2-n)} \\ \diagdown \\ Si \\ \diagup \\ X_n \end{array}$$

wherein R and R' are each selected from the group consisting of hydrogen and an alkyl radical containing from 1 to 5 carbon atoms, X is a halogen selected from the group consisting of chlorine, bromine and iodine, and $n$ is an integer of from 0 to 2 inclusive.

2. C,C'(1,1,3,3-tetramethyldisila oxanyl-1,3) carborane.

References Cited

UNITED STATES PATENTS 3,041,362  6/1962  Merker _____ 260—448.2

TOBIAS E. LEVOW, *Primary Examiner.*

P. F. SHAVER, *Assistant Examiner.*